United States Patent [19]

Abo et al.

[11] Patent Number: 4,672,814
[45] Date of Patent: Jun. 16, 1987

[54] METHOD AND APPARATUS FOR CONTROLLING SUPERCHARGE PRESSURE FOR A TURBOCHARGER

[75] Inventors: Toshimi Abo, Yokohama; Takashi Ueno, Yokosuka, both of Japan

[73] Assignee: Nissan Motor Co., Ltd., Kanagawa, Japan

[21] Appl. No.: 769,503

[22] Filed: Aug. 26, 1985

[30] Foreign Application Priority Data

Aug. 28, 1984 [JP] Japan ................. 59-178586

[51] Int. Cl.⁴ ............................................ F02B 37/12
[52] U.S. Cl. .................................................. 60/602
[58] Field of Search ................. 60/600, 601, 602, 603, 60/611; 123/564

[56] References Cited

U.S. PATENT DOCUMENTS 4,136,286  1/1979  O'Halloran et al. ............ 415/17 X
4,223,654  9/1980  Wessel et al. ...................... 123/358
4,392,352  7/1983  Stumpp et al. ....................... 60/602

FOREIGN PATENT DOCUMENTS

140523  8/1982  Japan ..................................... 60/602
60-56126  4/1985  Japan .

Primary Examiner—Michael Koczo
Attorney, Agent, or Firm—Schwartz, Jeffery, Schwaab, Mack, Blumenthal & Evans

[57] ABSTRACT

Method and apparatus for controlling supercharge pressure for a turbocharger in any of operating zones where proportional control and/or integral control are to be performed and can be selected in accordance with the result of the determination of operation zone determining means and the integral control can be performed only in a predetermined operation zone close to the target supercharge pressure. With this construction, the proportional control is made possible from the zone having a relatively low supercharge pressure and a quick response for the supercharge pressure can be obtained. In addition, a detrimental influence due to early starting of the integral control in the prior art can be avoided.

10 Claims, 7 Drawing Figures

METHOD AND APPARATUS FOR CONTROLLING SUPERCHARGE PRESSURE FOR A TURBOCHARGER

BACKGROUND OF THE INVENTION (1) Field of the Invention

The present invention relates to method and apparatus for controlling supercharge pressure for a turbocharger.

(2) Description of the Prior Art

A turbocharger is constructed in such a manner that exhaust turbine is rotated by exhaust gas at high temperature and at high pressure energy so that the pressure within the intake manifold increases above atmospheric pressure as the rotational speed of a compressor in the turbocharger increases. As a result, the supply of a large quantity of intake air flow to the engine becomes possible by the supercharge pressure thus obtained, with the result that high torque, high output and improvement of fuel consumption can be obtained.

Now, in a car engine having a wide range of engine speeds, it is possible to sufficiently secure the supercharge pressure in the middle and high speed operating zones. In the low speed operating zone, however, as it is difficult to obtain a sufficient exhaust pressure, the torque at low speed will tend to be insufficient, without deriving the supercharge pressure. In this case, it is known that the determinant of the supercharge pressure in the lower speed operating zone is the ratio A/R where A is the cross-sectional area of a scroll and R the radius from the center of a scroll. Accordingly, if the cross-sectional area can be made small in the low speed operating zone having a small quantity of the exhaust gas flow, the supercharge pressure can be increased by increasing the number of turbine rotations.

To this end, a turbocharger of the variable capacity type which has capacity charging means provided, with the ratio A/R of the turbine being variable, has already been proposed by the same applicant of this application (see, for instance, Japanese Patent Application Ser. No. 58-162918) in which a sufficient supercharge pressure can be obtained even when the turbocharger of the variable capacity type is operated in the low speed operating zone.

In the supercharge pressure control using the turbocharger described above, the provision is made for an actuator for driving the capacity changing means of the turbocharger, with the supercharge pressure being at work pressure or operation pressure which is produced downstream of a compressor and the supercharge pressure is maintained constant at a preset supercharge pressure, i.e., it is maintained constant by controlling the duty value of an electromagnetic valve which discharges the operating pressure to outside.

In the control characteristic of an electromagnetic valve where the X-axis indicates duty value (see, for instance, FIG. 5), the duty value signifies the opening time of the valve per a predetermined time, when it is 100 percent it indicates that it is fully opened and the cross-sectional area A is made minimum in this case by means of the actuator and the capacity changing means, so as to increase the number of turbine rotations.

On the other hand, when the duty value is zero, it indicates that the electromagnetic valve is fully closed, with the result that the sectional area A is made maximum and the number of turbine rotations is suppressed, thus controlling the supercharge pressure to be maintained constant. In the actual control, in this case, in order to overcome the deviation of control involving different dispersion factors, it is common practice to perform a feedback control in response to an actually detected value. In this example as well, the amount of feedback correction is calculated from the deviation between actual supercharge pressure and a target supercharge pressure and the duty value is corrected by this amount.

In order to achieve agreement between the actual supercharge pressure and the predetermined or target supercharge pressure in a variable capacity type turbocharger, a feedback control is performed. In this case, it is desirable to carry out the feedback control only in a controllable zone where the actual supercharge pressure can be made equal to the predetermined or target supercharge pressure. For instance, when the engine operates at low speed and low load conditions, there will be a limitation in the speed of the exhaust gas injected through a nozzle since the absolute amount in the exhaust gas flow is essentially small, even when the duty value is maintained at 100 percent, with the cross-sectional area of A being minimum so that there remains an uncontrollable zone where the actual supercharge pressure does not reach the target supercharge pressure.

If the feedback control, e.g., any of the proportional, integral, or/and differential controls, is carried out in this uncontrollable zone, the deviation of the actual supercharge pressure from the target supercharge pressure, which never reduces to zero, exists, so that the integral portion, i.e., the amplitude proportional to the integral value is especially dispersed. Accordingly when the engine speed increases from this condition, the actual supercharge pressure largely deviates from the target supercharge pressure due to the excessive correction amount and an overshoot occurs. On the other hand, when the actual supercharge pressure becomes excessive beyond the target supercharge pressure, knocking phenomena easily tend to occur.

In order to avoid the dispersion of the integral portion, the feedback control is often carried out. However, when the operation zone is excessively limited, the start of the feedback control becomes delayed. Since only a small value of the proportional portion having an amplitude proportional to the deviation can be obtained, the start of the supercharge pressure becomes delayed at the time of acceleration and the response tends to be low. On the contrary, when the operation zone is excessively expanded, the feedback control becomes too fast, the integral portion of the correction amount to be fed back becomes large as described above and generation of knocking is often brought about due to the overshoot of the supercharge pressure.

SUMMARY OF THE INVENTION

It is therefore an object of the present invention to provide a method and apparatus for controlling supercharge pressure in which a quick response in the leading edge of the supercharge pressure value can be secured by starting the proportional control at a relatively fast timing at the acceleration time in accordance with the result of the determination by determining means for determining the operation zone for performing feedback control, thereby preventing a detrimental effect on the integral action.

It is another object of the present invention to provide method and apparatus for controlling supercharge pressure for a turbocharger in which proportional and integral controls can be independently performed in each particular zone in such a manner that when the operation zone is far from the target supercharge pressure, the proportional control is performed for a turbocharger whilst the integral control is performed when the operation zone is close to the target supercharge pressure.

It is still another object of the present invention to provide a method and apparatus for controlling supercharge pressure for a turbocharger in which a bad influence due to early correction by the integral control according to the prior art can be avoided and the control accuracy for the feedback control can be improved in a broad range of operation zones.

One feature of the method of controlling supercharge pressure for a turbocharger according to the present invention resides in the method which comprises the steps of seeking a basic control amount of BASE from a look-up table in accordance with intake air flow Qa; determining if the actual supercharge pressure P2 detected is above a first predetermined value of supercharge pressure; calculating the deviation $\Delta P = Pset - P2$ between the first predetermined supercharge pressure Pset and the actual supercharge pressure P2 and also calculating proportional portion $PROP = k1 \times \Delta P$ in accordance with the result of the first determination; determining if the actual supercharge pressure P2 is above a second predetermined value; calculating integral portion $INT = K2 \times \Sigma \Delta P$ in accordance with the result of the second determination; selectively calculating each duty value $OUT = BASE + PROP + INT$ in accordance with the result of the first and second determination; and selectively controlling an electromagnetic valve for an actuator associated with a capacity changing means in accordance with a control signal having the duty value of OUT thus obtained.

Another feature of the apparatus for controlling supercharge pressure for a turbocharger according to the present invention resides in that the apparatus comprises a plurality of detecting means for detecting operating conditions of the engine such as air flow rate, supercharge pressure etc.; capacity changing means provided in a guide path of an exhaust pipe and having a shaft member coupled to an actuator through coupling means; an electromagnetic valve provided at a first liaison pipe for controlling the actuator in accordance with a control signal, and an electronic control unit having a microprocessor including a CPU, a ROM, and RAM for producing the control signal so as to control the electromagnetic valve in accordance with the operating conditions of the engine, detected by the plurality of detecting means.

These and other objects, features and advantages of the present invention will be better understood from the following detailed description of the embodiments of the invention with reference to the accompanying drawings.

DESCRIPTION OF THE PREFERRED EMBODIMENTS

Figure 1:
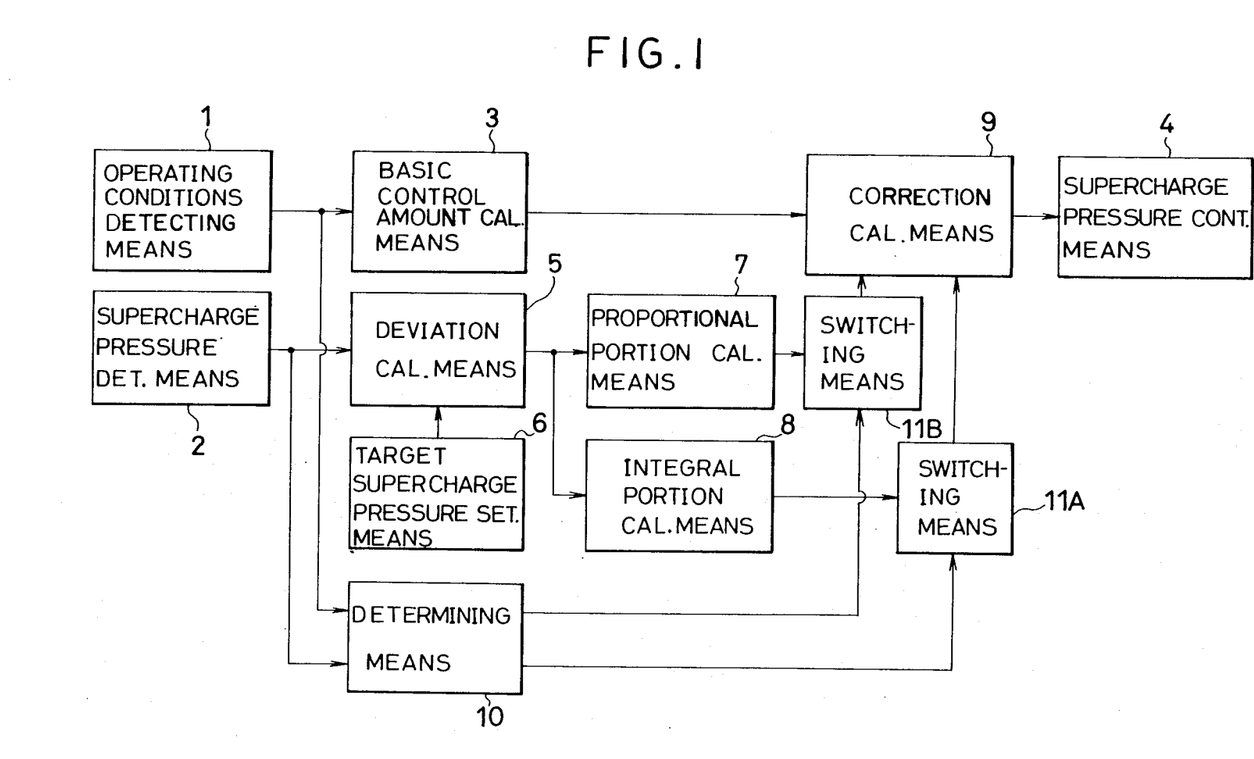
FIG. 1 illustrates a basic conception of the construction of the apparatus for controlling supercharge pressure for a turbocharger, according to the present invention.

Referring to FIG. 1, a basic conception of the construction of the apparatus for controlling supercharge pressure for a turbocharger according to the present invention comprises detecting means for detecting operating conditions of an engine 1, supercharge pressure detecting means 2, basic control amount calculating means 3, supercharge pressure control means 4, deviation calculating means 5, target supercharge pressure setting means 6, proportional portion calculating means 7, integral portion calculating means 8, correction calculating means 9, determining means 10, and switching means 11A and 11B.

The operating condition detecting means 1 detects the operating conditions of the engine and it detects, for instance, intake air flow as one of the parameters representative of the operating conditions of the engine. The basic control amount calculating means 3 calculates a basic control amount for controlling the supercharge pressure control means 4 from the parameters representative of the operating conditions of the engine. The supercharge pressure control means 4 comprises capacity changing means for controlling the exhaust gas flow to an exhaust turbine, an actuator for driving the capacity changing means, and control means for controlling the control amount of the actuator and it controls the actual supercharge pressure to a target or preset supercharge pressure in accordance with the basic control amount.

The supercharge pressure detecting means 2 detects the supercharge pressure which is pressurized by a compressor. The deviation calculating means 5 calculates the deviation between the actual supercharge pressure detected and the target supercharge pressure set up by the target supercharge pressure setting means 6. The proportional portion calculating means 7 and the integral portion calculating means 8 calculate the proportional portion and the integral portion of a correction amount to be fed back, respectively. The correction calculating means 9 corrects the basic control amount in accordance with the correction amount to be fed back. The determining means 10 determines each operation zone for performing the feedback control. Each output from the proportional portion calculating means 7 and the integral portion calculating means 8 is selectively applied to the correction calculating means 9 by the switching means 11A and 11B in accordance with the result of determination in the determining means 10.

With this construction, the proportional control and the integral control can be independently performed in each particular operation zone. Namely, the proportional control is performed in an operation zone which is far from the target supercharge pressure, while the integral control is carried out in another operation zone close to the target supercharge pressure, thereby sufficiently deriving the distinctive functions of proportional and integral controls themselves.

Figure 2:
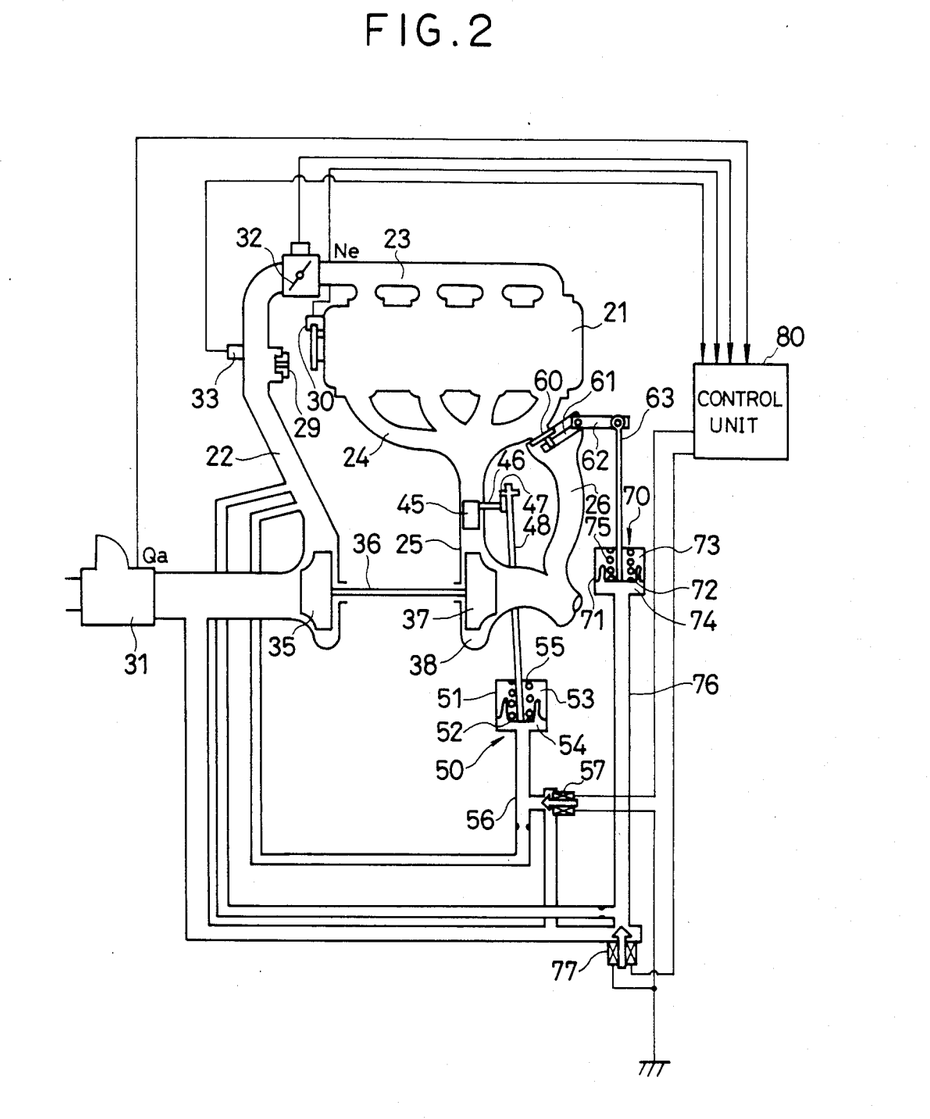
FIG. 2 illustrates an overall engine system having a turbocharger to which the method and apparatus according to the present invention are realized.

FIG. 2 shows an overall engine system having a turbocharger to which the present invention is applied. In the engine system, air is supplied to an engine 21 through an inlet pipe 22 and an inlet manifold 23 and exhaust gas is discharged through an outlet manifold 24 and an exhaust pipe 25.

At the left end of the inlet pipe 22, there is provided an air flow meter 31 for measuring the inlet air flow rate Qa and at the opposite side of the inlet pipe 22, there is provided a compressor 35 which constitutes part of the turbocharger, which supplies the intake air supply through the air flow meter 31 to the engine 21 after pressuring the air.

Figure 3:
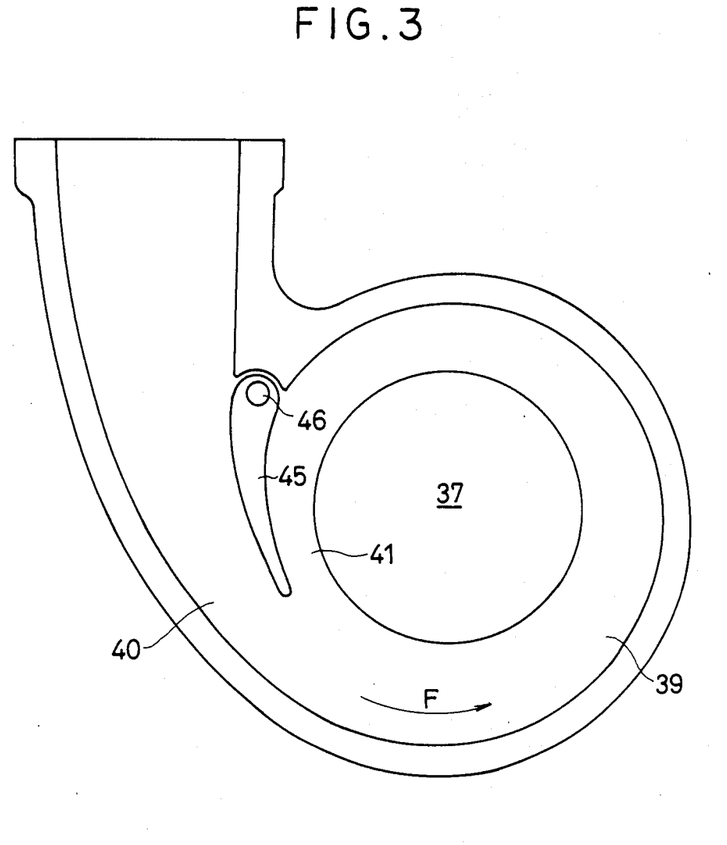
FIG. 3 illustrates an enlarged cross-sectional view of a scroll portion of the turbocharger, which has a movable tongue member as a capacity changing means.

At the bottom end portion of the inlet pipe 22 adjacent to the inlet manifold 25, there is provided a throttle valve 32 while a pressure release valve 29 is provided between the compressor 35 and the throttle valve 32. A turbine chamber 38 is formed at the bottom of the exhaust pipe 25 and a turbine 37 is provided within the turbine chamber 38, which is linked with the compressor 35 by a link shaft 36. The turbine chamber 38 is provided with a scroll 39 surrounding the turbine, as shown in FIG. 3. The scroll 39 is formed in such a manner that the cross-sectional area thereof is gradually reduced in a downstream direction from a guide path 40 as shown by the arrow F.

At the confluence of the guide path 40 to the scroll 39 and the terminal end 41 of the scroll 39, there is provided a movable tongue 45 as capacity changing means which constitutes a flap valve. The movable tongue 45 is pivotally supported by a shaft 46 so as to adjust the cross-sectional area of the guide path 40. The movable tongue 45 is provided within the exhaust pipe 25 in the figure near the upstream of the guide path 40 in the turbine 37. The shaft 46 pivotally supporting the movable tongue 45 is linked to the upper end of a rod 48 through an arm 47 and the lower end of the rod 48 is linked to a diaphragm 52 which constitutes an actuator 50 for driving the movable tongue 45.

A housing 51 having the diaphragm 52 is divided by the diaphragm 52 into an atmospheric chamber 53 and a positive pressure chamber 54. The positive pressure chamber 54 is communicated with the inlet pipe 22 located downstream of the compressor 35 through a liaison pipe 56, so that the supercharge pressure produced by the compressor 35 is supplied to the positive pressure chamber 54 and it pushes the diaphragm 52 to the atmospheric chamber 53 against the spring 55.

Moreover, an electromagnetic valve 57 is provided between the inlet pipe 22 and the liaison pipe 56, which is, when operated, to be opened by a control signal from a control unit 80 and the liaison pipe 56 is communicated with the atmosphere through the electromagnetic valve 57. As a result, the pressure within the positive pressure chamber 56 is lowered. Specifically, since the electromagnetic valve 57 is duty-controlled by the control unit 80 in such a manner that the larger the duty valve becomes, the more the degree of opening of the electromagnetic valve 57 increases, thus lowering the pressure in the positive pressure chamber 54. Accordingly, the diaphragm is moved downward by the action of the spring 55 in the atmospheric chamber 53 and this movement is transmitted to the movable tongue 45 through the rod 48, the arm 47 and the shaft 46, thus permitting the movable tongue 45 to be pivoted in the direction of reducing the guide path 40 for the exhaust gas to the turbine 37, i.e., in the direction of closing the guide path 40. As a result, the flow speed of the exhaust gas to be supplied to the turbine 37 increases and the supercharge pressure of the compressor 35 to the engine 21 also increases.

On the other hand, the smaller the duty value becomes, the more the degree of opening of the electromagnetic valve 57 decreases and in turn the pressure in the positive pressure chamber 54 increases and then the diaphragm 52 is moved upward against the force of the spring 55, thus permitting the movable tongue 45 to make a pivotal movement in the direction of opening the guide path 40. As a result, the flow speed of the exhaust gas to be supplied to the turbine 37 decreases and the supercharge pressure by the compressor 35 to the engine 21 is also lowered.

An exhaust bypass valve 60 is provided at the junction between an exhaust bypass path 26 for bypassing the turbine 37 and the exhaust manifold 24. The exhaust bypass valve 60 is linked to one end of a rod 63 through an arm 61 and a linkage member 62 and the other end of the rod 63 is linked to a diaphragm 72 in an actuator 70 so as to drive the bypass valve 60. A casing 71 having the diaphragm 72 is divided into an atmospheric chamber 73 and a positive pressure chamber 74 by the diaphragm 72. The atmospheric chamber 73 is provided with a spring 75 which is urged so as to push the diaphragm 72 toward the positive pressure chamber 74. The positive pressure chamber 74 is communicated with the inlet pipe 22 at the downstream of the compressor 35 through a liaison pipe 76 and the supercharge pressure produced by the compressor 35 is supplied to the positive pressure chamber 74.

Another electromagnetic valve 77 is provided at a liaison pipe 76 and when the electromagnetic valve 77 is opened by a control signal from the control unit 80, the liaison pipe 76 is communicated with the atmosphere through the electromagnetic valve 77, thus lowering the pressure within the positive pressure chamber 74. More specifically, the electromagnetic valve 77 is duty-controlled by the electronic control unit 80, so that the larger the duty valve thereof becomes, the more the degree of opening of the electromagnetic valve 77 increases. As a result, the pressure in the positive pressure chamber 74 is lowered and the diaphragm 72 is moved downward by the action of the spring 75 within the atmospheric chamber 73. This downward movement of the diaphragm 72 is transmitted to the exhaust bypass valve through the rod 63, the linkage member 62, and the arm 61 and the valve 60 is operated in the direction of closing the bypass path 26.

On the other hand, the smaller the duty valve becomes, the smaller the degree of opening of the electromagnetic valve 77 becomes so that the pressure in the positive pressure chamber 74 increases. As a result, the diaphragm 72 is moved upward against the spring 75 and the upward movement of the diaphragm permits the exhaust bypass valve 60 to be operated in the direction of opening. The function of valve 60 is to prevent the engine 21 from being damaged due to the excessive increase in intake supercharge pressure to be supplied to the engine 21 when the engine 21 operates in a high speed, high load condition. To this end, part of the exhaust gas from the engine 21 is discharged to the outside and a suitable supercharge pressure is introduced into the engine 21 by reducing the exhaust gas to be supplied to the turbine 37.

The electronic control unit 80 comprises a microprocessor including a central processing unit (CPU), a random access memory (RAM), and a read only memory (ROM), an A/D converter, and an input/output interface (all are not shown). The detected signals from the air flow meter 31, the crank angle sensor 30, the throttle valve 32, and the supercharge pressure sensor 33 are applied to the control unit 80 and they are converted into digital data corresponding to the intake air flow rate Qa, the engine speed Ne, the throttle valve opening to and the supercharge pressure P2 through the A/D converter in the control unit in the well-known manner.

The microprocessor, not shown, in the control unit 80 calculates each of suitable duty values of control signals to be applied to the electromagnetic valves 57 and 77 for driving the same, in accordance with the detected signals. As the result of controlling the electromagnetic valves 57 and 77, the exhaust bypass valve 45 is controlled and the cross-sectional area of the guide path 40 for the exhaust gas to the turbine 37 can be changed, while the amount of the exhaust gas to the turbine 37 is changed by the control of the exhaust bypass valve 60. By these actions, the intake supercharge pressure to be supplied to the engine 21 is suitably controlled in response to the intake air flow rate Qa, thus increasing the torque from the low speed operating zone to the high speed operating zone.

The movable tongue 45 and exhaust bypass valve 60 are constructed as a pair of supercharge pressure control means together with the actuators 50 and 70 and the electromagnetic valves 57 and 77 as control means. However, the operation zone to be fed back differs from each other. The present invention is applicable to any of the supercharge pressure control means described above. In this case, however, the movable tongue 45 is used as capacity changing means so as to control supercharge pressure.

Figure 4:
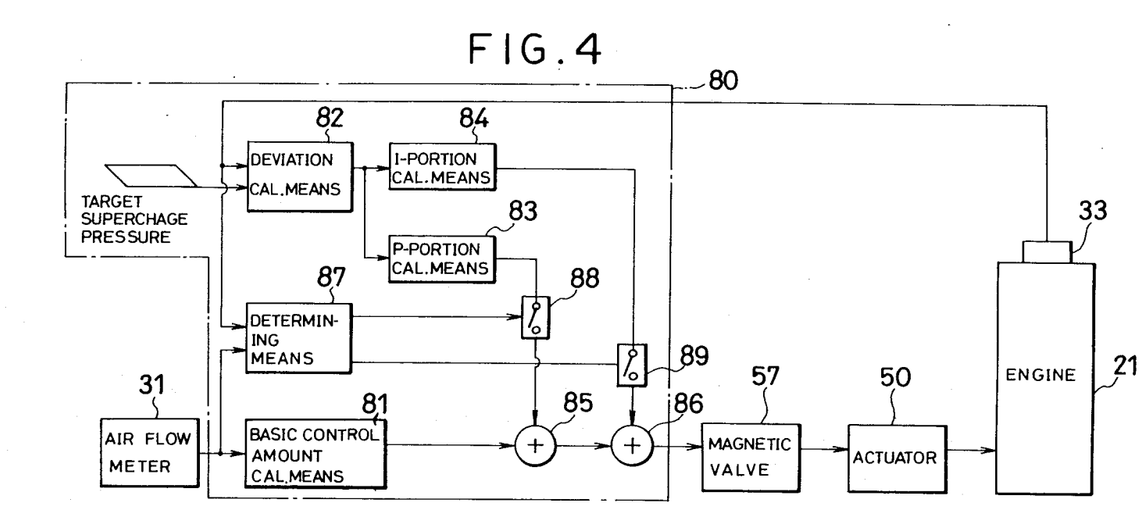
FIG. 4 illustrates a functional construction of the electronic control unit in FIG. 2.

FIG. 4 shows a functional construction of the control unit 80 shown in FIG. 2 and the associated control element and the engine 21. In the figure, basic control amount calculating means 81 calculates a basic control amount BASE of the duty value for driving the electromagnetic valve 57 by carrying out a table look-up in accordance with the intake air flow rate Qa detected by the air flow meter 31 and input to the control unit 80 as one of the operation parameters.

Figure 5:
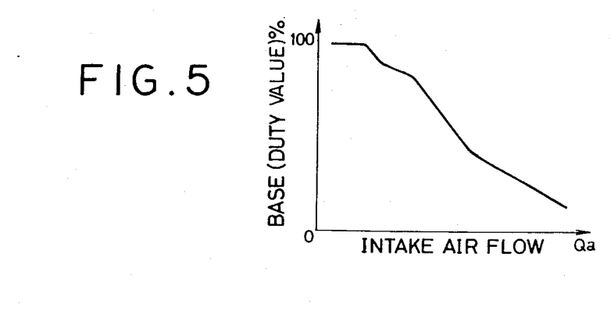
FIG. 5 illustrates a characteristic curve of a look-up table between the duty value and the intake air flow rate.

The electromagnetic valve 57 is opened in accordance with the basic control amount BASE and the supercharge pressure is controlled toward a preset value of the target supercharge pressure through the actuator 50 and the movable tongue 45 not shown in FIG. 4. More specifically, the duty value of the control signal for driving the electromagnetic valve 57 has been calculated in advance by experiment against the intake air flow rate Qa and the data thus obtained has been stored in the ROM of the microprocessor not shown. Then, suitable duty values necessary for each of the operating conditions of the engine 21 can be calculated by the table look-up operation, so as to keep track of the actual supercharge pressure to the preset supercharge pressure value. FIG. 5 shows data duty value vs. intake air flow rate Qa in a look-up table for use with a table look-up operation.

Turning back to FIG. 4, a feedback control is performed in order to cancel a stationary deviation based on different dispersion factors. Deviation calculating means 82 comprising a subtractor calculates the deviation $\Delta P$ ($\Delta P = Pset - P2$) between the actual supercharge pressure P2 detected by the supercharge pressure sensor 33 and a predetermined value of target supercharge pressure Pset. Correction amount calculating means for calculating each feedback correction amount consists of proportional portion calculating means 83 and integral portion calculating means 84 in the proportional and integral control and calculates the feedback correction amount based on the deviation $\Delta P$. Namely, the proportional portion calculating means 83 calculates the proportional portion PROP which has an amplitude proportional to the deviation $\Delta P$, while the integral portion calculating means 84 calculates the integral portion INT which has an amplitude proportional to the integral value of the deviation $\Delta P$.

Adders 85 and 86 as correction calculating means add the proportional and integral portion PROP and INT to the basic control amount BASE. By this addition, the feedback control for cancelling the stationary or standing deviation can be realized and the actual supercharge pressure can be controlled to the preset supercharge pressure.

Determining means 87 determines the operation zone to be integral-controlled in accordance with the detected intake air flow rate Qa representative of one of the operating conditions of the engine 21 and the actual supercharge pressure P2 detected by the supercharge pressure sensor 33. The operation zone is set up to an operation zone which is larger than a predetermined value, e.g., only 320 mmHg, from the target supercharge pressure.

Switching means 88 and 89 are both closed in the operation zone where the integral control is performed while in the operation zone below the predetermined value only the switching means 88 is closed in accordance with the result of the determination. As a result, in the operation zone where the integral control is performed proportional plus integral control is carried out, while in the operation zone where the integral control is not performed, only the proportional control is carried out.

Figure 6:
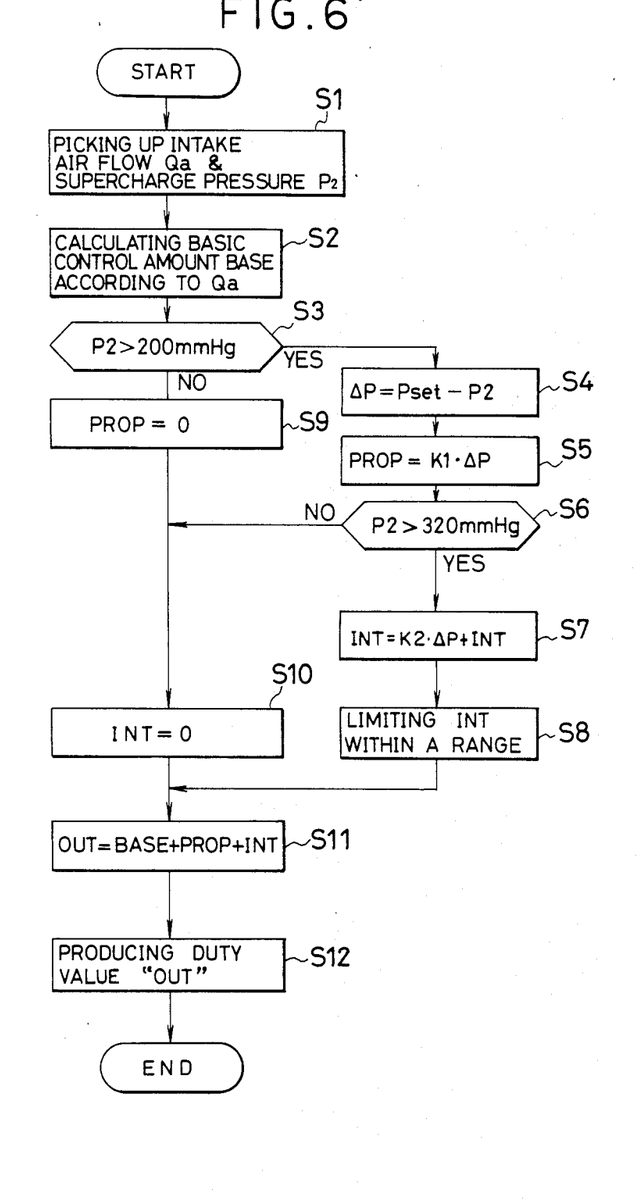
FIG. 6 illustrates one embodiment of a control flowchart of the method of controlling supercharge pressure for a turbocharger; according to the present invention.

Now, operation of the apparatus for controlling supercharge pressure for a turbocharger according to the present, invention will be explained with reference to the control flowchart shown in FIG. 6.

After starting the control, the intake air flow rate Qa detected by the air flow meter 31 and the supercharge pressure sensor 33 are picked up in the step S1 and the operation moves to the step S2. In the step S2, the basic control amount BASE of the duty value for the magnetic valve 57 is calculated by the table look-up operation in accordance with the air flow rate Qa. After this operation, the operation now moves to the step S3 where a first determination or decision is made if the actual supercharge pressure detected P2 is equal to or is larger than the predetermined value of 200 mmHg. When the actual supercharge pressure is above 200 mmHg, i.e., YES, the operation moves to the step S4 where the deviation $\Delta P = Pset - \Delta P2$ between the preset supercharge pressure and the actual supercharge pressure is calculated and the operation now moves to the step S5 where the proportional portion $PROP = K1 \times \Delta P$ is calculated in accordance with the deviation $\Delta P$ thus obtained (where K1 indicates a constant). After this operation, in step S6 another decision is made whether or not the actual supercharge pressure P2 is above a second predetermined value of 320 mmHg from to the target supercharge pressure. If the result of the decision is YES, that is the actual supercharge pressure is above 320 mmHg, the operation moves to the step S7 where the integration portion INT=K2×ΣΔP (where K2 indicates a constant) is calculated in accordance with the deviation ΔP, as the operation is considered in the zone where the integral control should be made. After this operation, it now moves to the step S8 where the integral portion INT thus obtained is limited to a certain range of values so as not to be excessively large. After executing this step, the operation now moves to the step S11.

In the step S11, the proportional and integral portions PROP and INT are added to the basic control amount BASE and a final duty value OUT=BASE+PROP+INT is calculated. After executing this calculation, the operation now moves to the step S12 where a control signal having the duty value of OUT is produced in accordance with the duty value and the control signal is applied to the electromagnetic valve 57 so as to drive the valve under the proportional and integral control.

On the other hand, if the result of the decision in the step S6 is NO, that is, the actual supercharge pressure P2 is below the predetermined second value of 320 mmHg, the operation moves to the step S10 where no calculation is carried out and the integral portion INT becomes zero. After this step, the operation moves to the step S11 and the final duty value OUT is calculated as described above.

Furthermore, if the result of the first decision in the step S3 is NO, that is, the actual supercharge pressure P2 is below the first predetermined value of 200 mmHg, the operation now moves to the step S9 as the control is not in the operation zone where the feedback control is performed. In the step S9, no calculation is carried out and the basic control amount BASE is produced as the final duty value OUT as it is in the subsequent processing steps S10, S11, S12 without the proportional and integral portions to be added to the basic control amount BASE, that is, OUT=BASE, with PROP=0 and INT=0.

According to the present invention, a feedback control is started from a relatively low speed operation zone of the supercharge pressure. Since the difference between the actual supercharge pressure and the target supercharge pressure is large in this low speed operation zone and the proportional control is performed in the zone based on the relatively large difference, a quick response in the supercharge pressure is obtained, i.e., the leading edge of the actual supercharge pressure rises quickly. In addition, in a zone where the integral control begins to perform some time after the proportional control, optimum feedback control can be performed to the preset supercharge pressure by the integral portion having a suitable magnitude based on the integral control. As a result, a bad influence of the integral control in the low speed operation zone can be prevented according to the present invention. The disadvantage of an early starting of the integral control according to the prior art which otherwise occurred, i.e., the earlier the feedback control starts, the larger the integral portion becomes and the continuous control based on the large integral portion in the zone close to the preset supercharge pressure causes the correction amount to be unnecessarily large, even when the difference between the actual and target supercharge pressures is small, which would bring about an overshoot control, can be prevented. According to the invention, the overshoot control for the actual supercharge pressure beyond the preset supercharge pressure due to the excessive correction amount can also be prevented.

Figure 7:
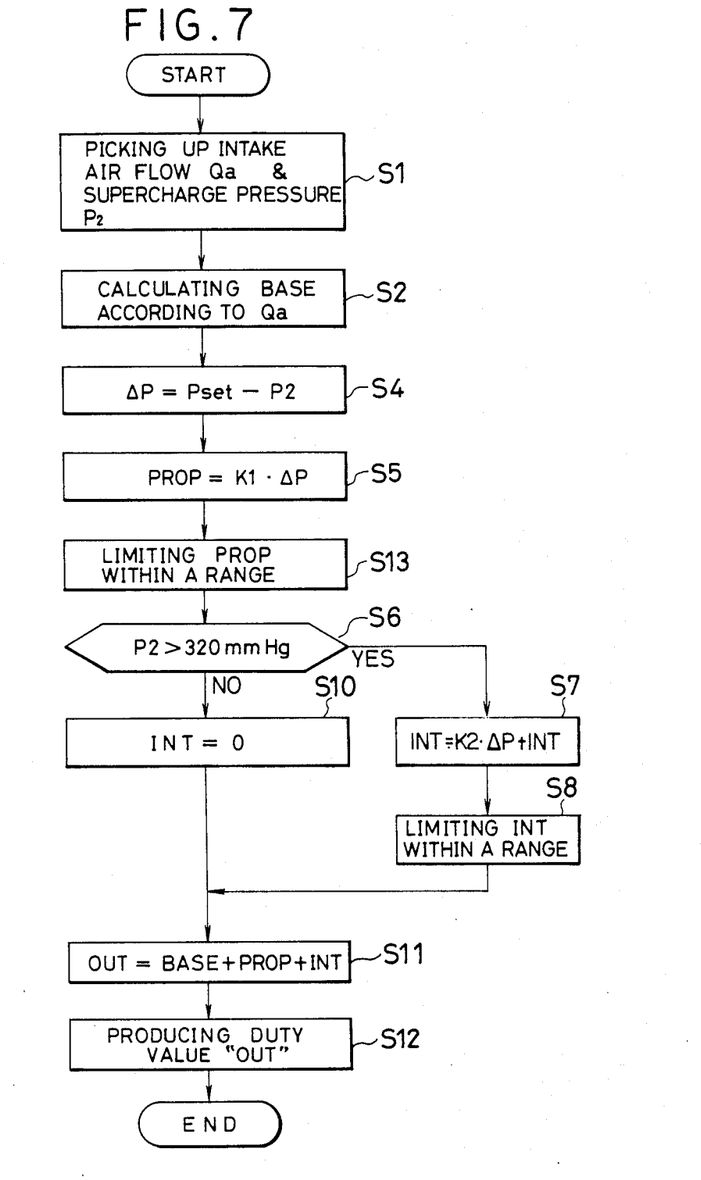
FIG. 7 illustrates another embodiment of a control flowchart of the method of controlling supercharge pressure according to the present invention.

FIG. 7 shows a control flow chart of a second embodiment acording to the present invention.

In this embodiment, the proportional control is always carried out whereas in the foregoing embodiment the proportional control is performed only in the operation zone where a large scale feedback control is performed in the supercharge pressure which is above 200 mmHg. In other words, the integral control is performed in the zone where the actual supercharge pressure P2 is above 320 mmHg in the step S6 through S8, S11 and S12, while the proportional control is performed in all operation zones without limitation of the supercharge pressure in the steps S5, S6, S10 to S12. In this case, however, the more the difference between the actual supercharge pressure and the target supercharge pressure becomes large, the more the proportional control has a larger value, thus increasing the response in a relatively low zone of the supercharge pressure.

Consequently, when the feedback control is deviated from a controllable zone, the feedback control itself can no longer be performed, the value of the proportional portion is practically limited within a predetermined range of values as shown in the step S13. The second embodiment can also produce the same effect as that described in the first embodiment.

The determination for the operation zone where the integral control is performed can be realized by use of the engine parameters such as intake air flow rate. In this case, however, since the increase in the supercharge pressure is rapid at the acceleration time as compared with the increase in the intake air flow, the start of the feedback control becomes delayed, thus producing the disadvantage of an overshoot. It is therefore desirable to directly determine the operation zone to be feedback controlled.

Moreover, in the foregoing first and second embodiments proportional and integral control are applied thereto. It is to be understood that a combination of proportional, integral and differential controls may be also utilized by adding differential portion which improves the transient response. It is also apparent that the supercharge pressure control by the exhaust bypass valve is also applicable.

In the apparatus for controlling supercharge pressure for a turbocharger according to the present invention, the supercharge pressure is maintained at a target supercharge pressure by controlling the capacity changing means so as to change the ratio of A/R of the exhaust turbine in accordance with the operating conditions of the engine and the actual supercharge pressure is feedback-controlled in accordance with the actual supercharge pressure. Any of the operating zones where the proportional control and the integral control are to be performed can be selected in accordance with the result of the determination of the determining means for determining the operating zone to be feedback-controlled, and the integral control can be performed only in a predetermined operation zone close to the target supercharge pressure. Accordingly, the proportional control is made possible from the zone having a relatively low supercharge pressure and a quick response for the supercharge pressure can be obtained.

In addition, a bad influence due to the early start of the integral control can be avoided, thus realizing the improvement of the control accuracy for feedback control in the broad operation zones.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method for controlling supercharge pressure of a turbocharger, which comprises the steps of:
   (a) seeking a basic control amount, BASE, from a look-up table in accordance with an intake air flow rate Qa;
   (b) determining if an actual supercharge pressure P2 detected is greater than a first predetermined value of supercharge pressure;
   (c) calculating the deviation $\Delta P$ between the first predetermined supercharge pressure and the actual supercharge pressure P2, and also calculating a proportional value portion (PROP=K1×$\Delta P$) where K1 is a first constant;
   (d) determining if the actual supercharge pressure P2 is greater than a second predetermined value of supercharge pressure;
   (e) calculating an integral value portion INT=(K2×$\Delta P$+INT') when the actual supercharge pressure P2 is greater than the second predetermined value where K2 is a second constant and INT' is a value of INT resulting from a prior calculation, and setting INT to be zero when the actual supercharge pressure P2 is not greater than the second predetermined pressure;
   (f) calculating a duty value OUT which is a sum of BASE, PROP and INT; and
   (g) actuating an electromagnetic valve for controlling the supercharge pressure in accordance with the duty value OUT.

2. A method for controlling supercharge pressure as claimed in claim 1 wherein a method further comprises the step of limiting the integral value portion INT within a predetermined range thereof.

3. A method for controlling supercharge pressure as claimed in claim 1, wherein when the supercharge pressure P2 is not greater than the first perdetermined value, the proportional and integral value portions are zero and the duty value OUT becomes equal to BASE.

4. A method for controlling supercharge pressure of a turbocharger, which comprises the steps of:
   (a) seeking a basic control amount BASE from a look-up table in accordance with an intake air flow rate Qa;
   (b) calculating the deviation $\Delta P$ between a preset supercharge pressure and the actual supercharge pressure P2 detected and also calculating a proportional value portion (PROP=K1×$\Delta P$) from the deviation where K1 is a first constant;
   (c) determining if the actual supercharge pressure P2 is greater than a predetermined value;
   (d) calculating an integral value portion INT=(K2×$\Delta P$+INT') INT? ) when the actual supercharge when the actual supercharge pressure P2 is greater than the predetermined value where K2 is a second constant and INT' is a value of INT from a prior calculation, the integral value portion INT being set to be zero when the actual supercharge pressure P2 is not greater than the predetermined value;
   (e) calculating a duty value OUT which is a sum of BASE, PROP and INT; and
   (f) actuating an electromagnetic valve for controlling the supercharge pressure in accordance with the duty value OUT.

5. A method for controlling supercharge pressure of a turbocharger as claimed in claim 4 wherein the method further comprises a step of limiting the proportional and integral value portions within respective predetermined ranges.

6. A method for controlling supercharge pressure of a turbocharger as claimed in claim 4 wherein when the actual supercharge pressure P2 detected is not greater than the predetermined value, the duty value OUT is equal to a sum of BASE and PROP.

7. An apparatus for controlling supercharge pressure of a turbocharger comprising:
   operational state detecting means for detecting operating conditions of an engine connected to the turbocharger;
   supercharge pressure detecting means for detecting the supercharge pressure of the turbocharger;
   basic control amount calculating means for calculating a basic control amount from the operating conditions of the engine detected by the operational state detecting means:
   deviation calculating means for calculating the deviation between an actually detected supercharge pressure from the supercharge pressure detectng means and a preset supercharge pressure stored in the deviation calculating means;
   judging means for judging operational regions for performing proportional and integral controls in the feedback control of the supercharge pressure;
   proportional portion calculating means for calculating the proportional portion of the feedback correction amount based on the deviation of the deviation calculating means in the operational region in which the supercharge pressure is far from the preset supercharge pressure;
   integral portion calculating means for calculating the integral portion of the feedback correction amount based on the deviation of the deviation calculating means in the operational region in which the supercharge pressure is near the preset supercharge pressure;
   switching means for selectively switching the outputs from the proportional and integral portion calculating means;
   correction calculating means for calculating the correction of the basic control amount from the basic control amount calculating means based on the selected output from the switching means; and
   supercharge pressure control means for controlling the supercharge pressure of the turbocharger based on the output of the correction calculating means.

8. An apparatus for controlling supercharge pressure of a turbocharger as claimed in claim 7 wherein said operational state detecting means has a plurality of detecting devices for detecting the operating conditions of the engine such as air flow rate and supercharge pressure, and said supercharge pressure control means has a supercharge pressure control device provided in an exhaust portion of the engine and having a shaft member for actuating the control device to control the supercharge pressure, the control device being connected to an actuator for actuating the shaft member of the control device, said supercharge pressure control means further having an electromagnetic valve for controlling the operation of said actuator, and a control unit producing a control signal for controlling the actuation of the electromagnetic valve in accordance with the operating conditions of the engine detected by the plurality of detecting devices.

9. An apparatus for controlling supercharge pressure as claimed in claim 8 wherein predetermined data for controlling the supercharge pressure have preliminarily been stored in the control unit.

10. An apparatus for controlling supercharge pressure as claimed in claim 8 wherein a look-up table relating the intake air flow rate to a duty value for controlling the supercharge pressure has preliminarily been stored in the control unit.

* * * * *